United States Patent [19]

Muncy et al.

[11] Patent Number: 4,931,615
[45] Date of Patent: Jun. 5, 1990

[54] APPARATUS FOR MACHINING INTRICATE FEATURE CUTS IN THIN WALLED TUBULAR PARTS

[75] Inventors: Donald G. Muncy, Wilmington, N.C.; William B. Plotts, Marlow, N.H.

[73] Assignee: General Electric Company, San Jose, Calif.

[21] Appl. No.: 279,007

[22] Filed: Dec. 2, 1988

[51] Int. Cl.$^5$ .............................................. B23K 26/00
[52] U.S. Cl. .......................... 219/121.67; 219/121.72; 219/121.76; 219/121.82; 219/121.84
[58] Field of Search ........... 219/121.6, 121.85, 121.67, 219/121.72, 121.18, 121.82, 121.84; 364/474.08

[56] References Cited

U.S. PATENT DOCUMENTS

| | | | |
|---|---|---|---|
| 4,590,652 | 5/1986 | Harwood | 219/121.67 X |
| 4,644,128 | 2/1987 | Palentyn et al. | 219/121.67 |
| 4,806,726 | 2/1989 | Rosa et al. | 219/121.67 |

Primary Examiner—C. L. Albritton
Attorney, Agent, or Firm—Robert R. Schroeder

[57] ABSTRACT

Tubular parts are delivered in successive pairs to separate rotary positioners where they are held for machining in parallel by twin laser cutting beams directed thereat by a commonly mounted pair of focussing heads. The rotary positioners are commonly rotated through a programmed series of angular motions in conjunction with a programmed series of joint X and Y axes linear motions of the focusing heads to scan the cutting beam over the surfaces of the parts and thus machine identical feature cuts in the sidewall of each part. Machining is performed under an inert gas atmosphere, and cuttings are vacuumed from the machining sites through apertured mandrels inserted into the part bores.

18 Claims, 6 Drawing Sheets

APPARATUS FOR MACHINING INTRICATE FEATURE CUTS IN THIN WALLED TUBULAR PARTS

BACKGROUND OF THE INVENTION

Nuclear power reactors are a well known source of energy. In one type of nuclear reactor the nuclear fuel is comprised of elongated rods formed of sealed cladding tubes of suitable material, such as a zirconium alloy, containing uranium oxide and/or plutonium oxide as the nuclear fuel. A number of these fuel rods are grouped together and contained in an open-ended tubular flow channel to form a separately removable fuel assembly or bundle. A sufficient number of these fuel bundles are arranged in a matrix, approximating a right circular cylinder, to form the nuclear reactor core capable of self-sustaining a fission reaction. The core is submerged in a fluid, such as light water, which serves both as a coolant and as a neutron moderator.

A typical fuel bundle is formed by an array of spaced fuel rods supported between upper and lower tie plates; the rods typically being in excess of ten feet in length, on the order of one-half inch in diameter and spaced from one another by a fraction of an inch. To provide proper coolant flow past the fuel rods it is important to maintain the rods in precisely controlled, spaced relation such as to prevent bowing and vibration during reactor operation. A plurality of fuel rod spacers are thus utilized at spaced intervals along the length of the fuel bundle for this purpose.

Design considerations of such fuel rod bundle spacers include the following: retention of rod-to-rod spacing; retention of fuel bundle shape; allowance for fuel rod thermal expansion; restriction of fuel rod vibration; ease of fuel bundle assembly; minimization of contact areas between spacer and fuel rods; maintenance of structural integrity of the spacer under normal and abnormal (such as seismic) loads; minimization of reactor coolant flow distortion and restriction; maximization of thermal limits; minimization of parasitic neutron absorption; and minimization of manufacturing costs including adaptation to automated production.

Commonly assigned Matzner et al. U.S. Pat. No. 4,508,679 discloses and claims a nuclear fuel rod bundle spacer uniquely constructed to address these design concerns. As disclosed therein, a spacer is formed of an array of conjoined tubular cells or ferrules surrounded by a peripheral support band, each ferrule bore thus providing a passage through which a fuel rod or other elongated element of the fuel bundle is inserted. The ferrules are welded together and to the peripheral support band to provide an assembly of high structural strength, wherein the thickness of the metal used to form the peripheral support band and ferrules can be minimized to reduce coolant flow resistance and parasitic neutron absorption. Neutron absorption is further decreased by forming the ferrules and peripheral support band of low neutron absorption cross section material.

The rods or elements extending through the ferrules are centered and laterally supported therein between rigid projections and resilient members. The rigid projections or stops are inwardly formed as fluted or dimpled portions of the ferrule wall at locations near the upper and lower ferrule edges to maximize the axial distance therebetween and thus enhance fuel rod support. The stops are also angularly oriented to minimize projected area and thus disturbance of coolant flow.

The resilient members take the form of slender continuous loop springs of generally elliptical shape held captive by oppositely directed tabs formed by C-shaped cutouts in the walls of a pair of adjacent ferrules, whereby the two sides of each spring member project into the bores of its ferrule pair. Thus, a single spring serves two ferrules in biasing the fuel rods into contact with the two axially spaced pairs of stops pursuant to centering them in the ferrule bores.

A typical large nuclear reactor core may include on the order of 800 fuel rod bundles, each with as many as seven spacers, and each spacer may comprise sixty fuel or more rod-positioning ferrules. From this, it is seen that automated, expedited production of a rather involved assembly of many piece parts to manufacture a nuclear fuel rod spacer of such construction is of vital necessity.

It is accordingly an object of the present invention to provide apparatus for effecting intricate cuts in the sidewall of tubular parts on an automated production line basis.

A further object is to provide apparatus of the above-character wherein the parts are automatically delivered, positioned and feature cut in rapid succession.

An additional object is to provide apparatus of the above-character for creating precision feature cuts in the sidewall of ferrules utilized in nuclear fuel bundle spacers.

Other objects of the invention will in part be obvious and in part appear hereinafter.

SUMMARY OF THE INVENTION

In accordance with the present invention, there is provided automated apparatus for creating intricate feature cuts in the thin sidewall of a succession of tubular parts. The parts, nuclear fuel rod spacer ferrules in the illustrated embodiment of the invention, are delivered in succession to a predetermined machining position where each ferrule is grasp by a rotary positioner capable of rotating a ferrule about its axis. A machining instrumentality, specifically a laser, is mounted with its focussing head positioned to direct a cutting beam at the side wall of each ferrule in its machining position. The relationship of the ferrule and laser beam, as well as the angular orientation of the ferrule about its axis, are jointly varied in multiple programmed series of motions to cause the laser beam to scan the ferrule surface and thus machine the prescribed feature through-cuts in its sidewall.

In accordance with a feature of the present invention, an apertured mandrel, connected to an vacuum source, is inserted into the ferrule bore to exhaust all metal cuttings created during the machining operation.

Preferably, the laser source generates twin cutting beams which are respectively directed by separate focussing heads at a pair of ferrules which are feed along parallel delivery paths to spaced machining positions where they are grasp by separate rotary positioners. Thus, the laser cutting operations on each pair of ferrules can be conveniently performed on a synchronized, parallel basis to effectively double the output of the apparatus.

The invention accordingly comprises the features of construction, combination of elements, and arrangement of parts, all of which will be exemplified in the construction hereinafter set forth, and the scope of the invention will be indicated in the claims.

For a full understanding of the nature and objects of the present invention, reference may be had to the following Detailed Description taken in conjunction with the accompanying drawings, in which.

Corresponding reference numerals refer to like parts throughout the several views of the drawings.

Detailed Description

Figure 1:
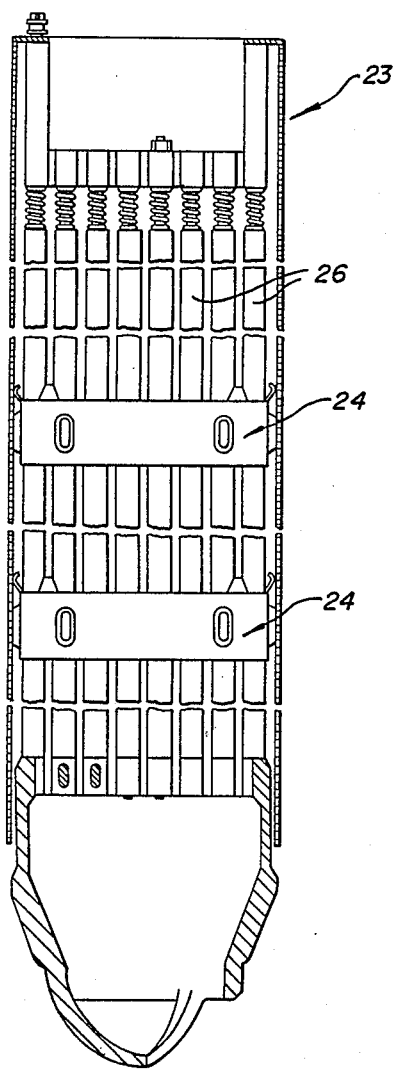
FIG. 1 is an elevational view, partially broken away, of a nuclear fuel bundle.
Figure 2:
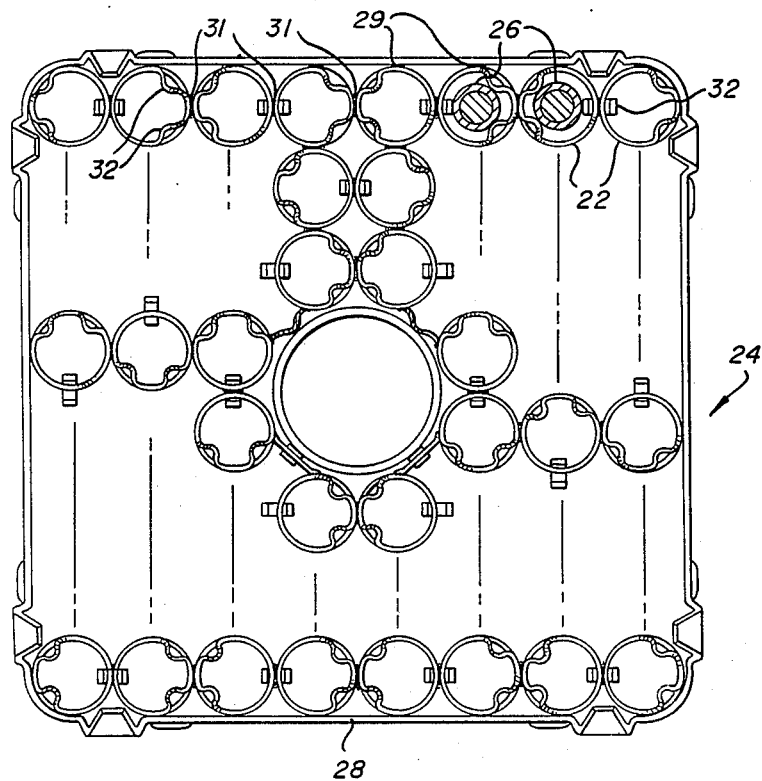
FIG. 2 is a plan view of one of the spacers utilized in the fuel bundle of FIG. 1 and incorporating a multiplicity of fuel rod-positioning ferrules.
Figure 3:
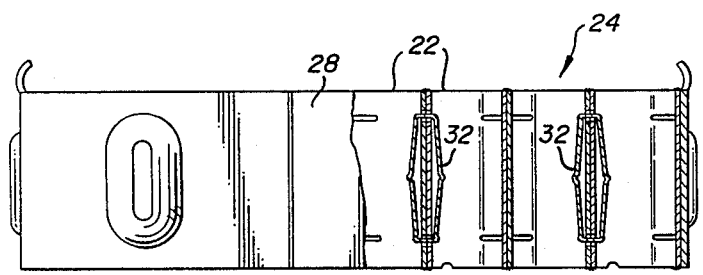
FIG. 3 is a side view, partially broken away, of the spacer of FIG. 2.
Figure 5:
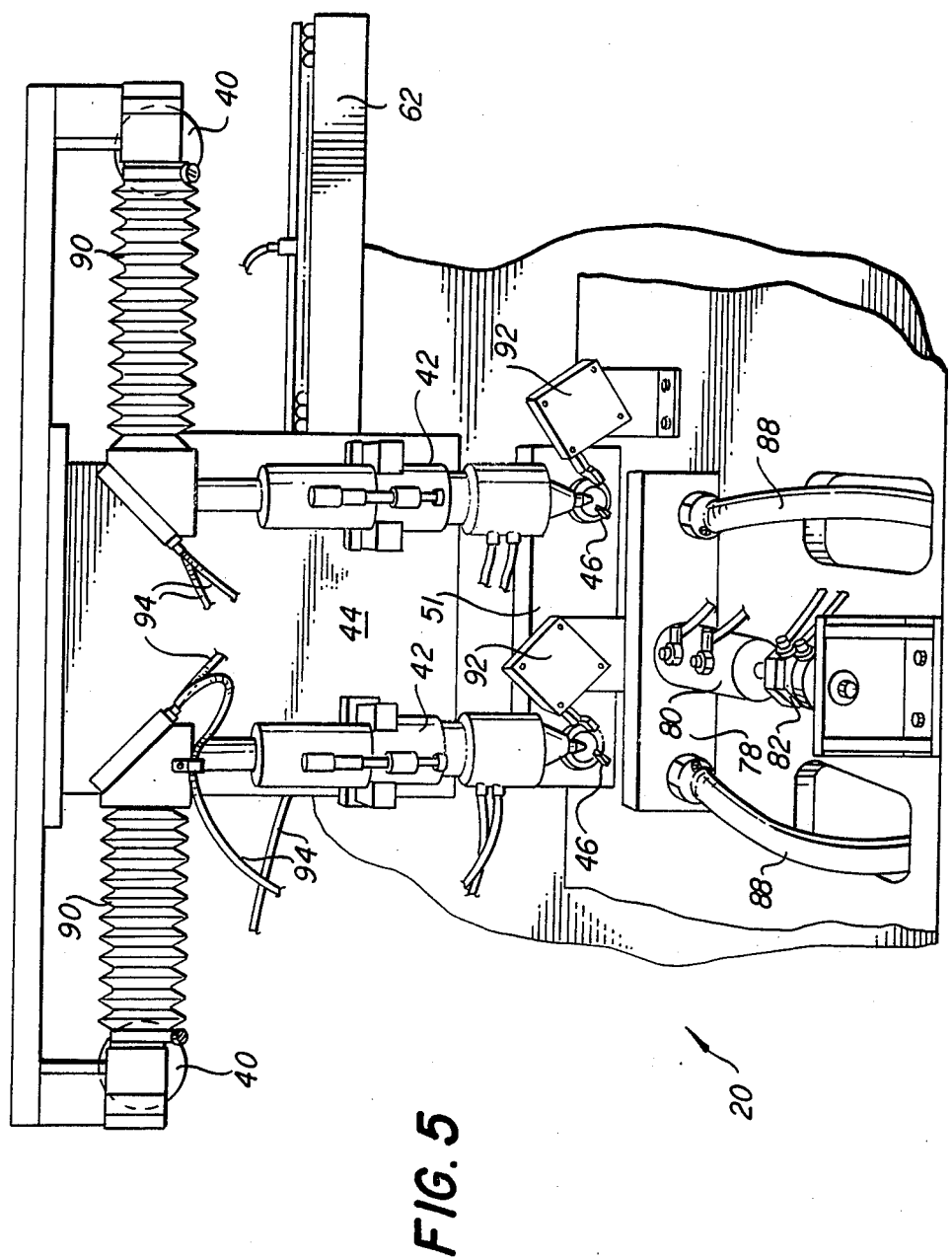
FIG. 5 is a frontal perspective view of a laser machining apparatus constructed in accordance wih the present invention.

The automated apparatus of the present invention, generally indicated at 20 in FIG. 5, is disclosed in its embodiment devoted to machining a multiplicity of feature cuts in the thin sidewalls of tubular ferrules 22 utilized in a spacer, generally indicated at 24 in FIGS. 1 through 3. These spacers are utilized to precisely maintain the relative positions of a plurality of nuclear fuel rods in a fuel bundle, as disclosed in the commonly assigned Matzner U.S. Pat. No. 4,508,679 and as generally indicated at 23 in FIG. 1 herein. Thus, each ferrule bore provides a passage or cell through which an individual fuel rod 26 is inserted. The ferrule array is surrounded by a perimetrical band 28, to which the ferrules in the outermost rows and columns are conjoined at contiguous upper and lower edge points by suitable means, such as welds indicated at 29. Contiguous edges of adjacent ferrules are also conjoined by welds, indicated at 31, to create a rigid spacer assembly. Welding apparatus for this purpose is disclosed and claimed in commonly assigned Muncy et al. copending application Ser. No. 394,289, entitled "System for Automated Welding of Parts Assembly in Controlled Environment", filed Aug. 14, 1989, which is a continuation of abandoned application Ser. No. 271,010, filed Dec. 2, 1988.

To position each fuel rod within a ferrule bore, the sidewall of each ferrule 22 is formed at each end with a pair of angularly spaced, inwardly projecting dimples or stops 30 of a precision stop height. Suitable stop forming apparatus is disclosed and claimed in concurrently filed, commonly assigned King et al. copending application Ser. No. 279,009, entitled "Automated Forming Apparatus". Assembled with each different pair of ferrules is a double-acting, continuous loop spring 32 which serves to bias the fuel rods against the stops of the associated ferrule pair. Thus, the fuel rods are precisely centered within each ferrule bore. Automated apparatus for checking the stop height dimention is disclosed in concurrently filed, commonly assigned Reeves et al. copending application Ser. No. 279,008, entitled "Automated Guaging Apparatus".

To accommodate the assembly of spring 32 to each ferrule pair, a C-shaped cutout 34 is cut into the sidewall of each ferrule, as seen in FIG. 2, to provide a longitudinally elongated opening 34a and a circumferentially projecting tab 34b flanked by circumferentially extending notches 34c. In addition, circumferential slits 31 are cut into the ferrule 5 sidewall to facilitate the formation of stops 30, and a notch 33 is cut into one edge of the ferrule to reference the relative angular positions of the slits and cutout. Initially, two ferrules are juxtaposed in paired side-by-side relation with their cutout opening 34a in aligned, confronting relation. A spring 32 is centered in the aligned openings, and the ferrules are then rotated in opposite directions. Tabs 34b are thus swung in opposite directions to enter the open interior of spring 32, which then becomes captured in the cooperating notches 34c of the ferrule pair, all as described in the above-cited U.S. Pat. No. 4,508,679. Automated apparatus for assembling a ferrule pair with captive spring is disclosed and claimed in concurrently filed, commonly assigned Moreno et al. copending application Ser. No. 279,006, entitled "Automated Assembly Apparatus".

Figure 4:
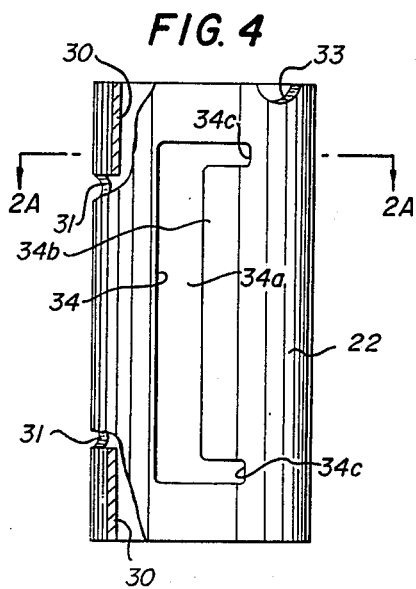
FIG. 4 is an enlarged side view, partially broken away of one of the ferrules seen in FIGS. 2 and 3 to illustrate the requisite feature cuts created in its sidewall.
Figure 6:
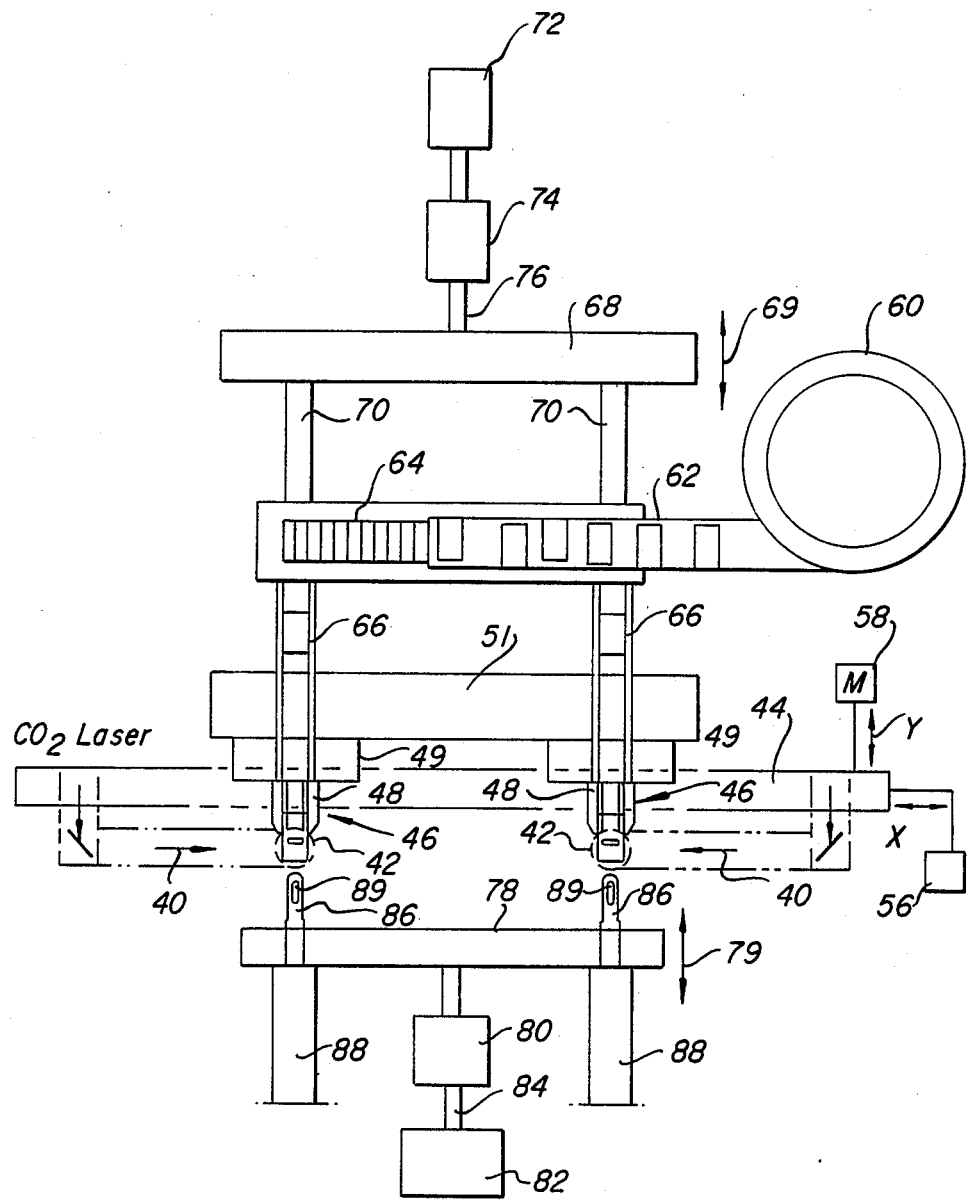
FIG. 6 is a plan view in diagramatic form of the laser machining apparatus of FIG. 5.
Figure 7:
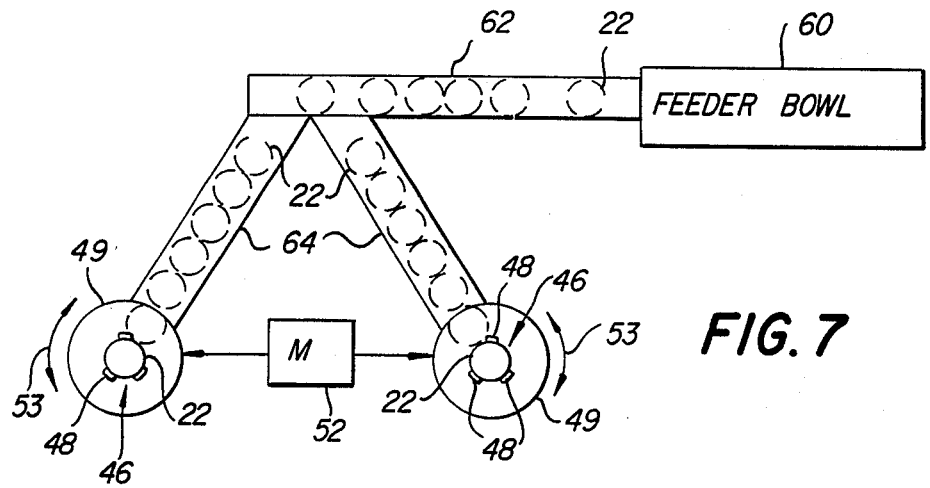
FIG. 7 is a fragmentary front view in diagramatic form of the laser machining apparatus of FIG. 5 illustrating the parallel delivery of parts for synchronized cutting of successive pairs of parts.
Figure 8:
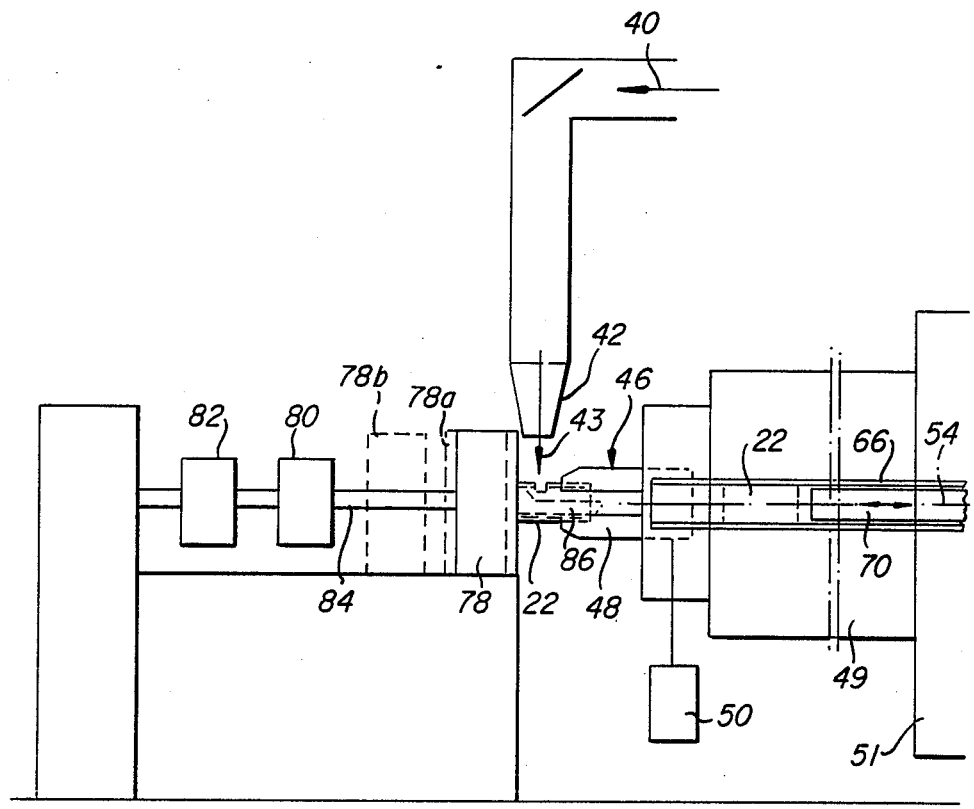
FIG. 8 is a fragmentary side view in diagramatic form of the laser machining apparatus of FIG. 5 illustrating the operations of the metal cuttings exhaust and part positioning mechanism.

The machining apparatus 20 of FIGS. 5 through 8 operates to cut C-shaped cutout 34, slits 31 and reference notch 33 (FIG. 4) in the sidewall of ferrule 22 on an automated, production line basis. Referring first to FIG. 5, the machining apparatus of the present invention iucludes a suitable laser, such as a Coherent General Model M48-2 $CO_2$ laser, capable of generating twin beams of substantially equal power, which are in turn directed along separate, parallel optical paths 40 to a pair of focussing heads 42 commonly mounted by a support plate 44. The focussing heads are vertically oriented to aim laser cutting beams 43 (FIG. 8) downwardly for impingement on the sidewalls of a pair of ferrules 22 held in machining positions by separate sets 46 of gripper fingers. As best seen in FIGS. 7 and 8 each gripper set 46 includes three equally angularly spaced fingers 48 which are carried by an arbor 49 and actuated by suitable means, such as an air cylinder 50, to grasp the peripherial surface of a ferrule while leaving ample space between fingers to machine the C-shaped cutout 34, slits 31 and notch 33 in the ferrule sidewall. The gripper finger arbors, journalled by common mounting block 51 (FIGS. 6 and 8) are commonly bidirectionally driven by a motor 52, as indicated by arrows 53, such as to rotate a gripped ferrule about its axis 54.

Turning to FIG. 6, focussing head support plate 44 is mounted for linear movement by a motor 56 along an X axis perpendicular to axes 54 of a pair of ferrules held in their machining positions, while a motor 58 translates the support plate along a Y axis parallel to the ferrule axes. The drives of support plate translating motors 56, 58 and arbor rotating motor 52 are coordinated by a suitable computer numerical controller (not shown), such as a General Electric Company MC2000 controller, to scan laser cutting beams 43 over the ferrule sidewall peripheries to machine the C-shaped cutouts, slits and notches therein. X axis motions are utilized in conjunction with Y axis motions in machining the radius portions of these intricate feature cuts.

As seen in FIGS. 6 and 7, ferrules cut to length from seamless tubular stock, such as disclosed in the commonly assigned White et al. U.S. Pat. No. 4,869,865, entitled "Method of Manufacturing Nuclear Fuel Bundle Spacers", are accumulated in a vibratory bowl feeder 60. From this feeder, ferrules 22 are routed seriatim along a horizontal track 62 to a point where they are alternately diverted into a pair of inclined magazines 64 whose lower exit ends communicate with spaced, parallel feed tubes 66. These feed tubes are supported by arbor mounting block 51 for respective extension coaxially through the arbors to terminations just short of the gripper finger sets 46. A transversely elongated header 68 carries a pair of rods 70 in respective positions aligned with the two feed tubes 66. A singulating air cylinder 72 and a positioning air cylinder 74, acting via common plunger shaft 76, reciprocates, as indicated by arrow 69, the header and its rods 70 into tubes 66 to firstly control the loading of a single ferrule from each magazine 64 into each tube 66 and secondly to push each loaded ferrule forwardly through the tubes to their respective machining positions.

To define the respective ferrule machining positions, a second transversely elongated header 78 is mounted for reciprocation, as indicated by arrow 79, by a pair of air cylinders 80 and 82 acting on a common plunger shaft 84. This header mounts a pair of mandrels 86 in positions aligned with the bores of the two ferrules 22 held in their respective machining positions. These mandrels, which are connected by hoses 88 leading to high flow vacuum exhaust source (not shown), are provided with large intake openings 89, as best seen in FIGS. 6 and 8. The actuations of air cylinders 80 and 82 are coordinated to reciprocate header 78 to its solid line reference position seen in FIG. 8, such that, with the gripper finger sets 46 opened, it provides a common stop against which the ferrules are pushed by rods 70 to define their respective axial machining positions. The gripper finger sets are then closed by air cylinder 50 to grasp and hold the ferrules thereat. The header 78 is then retracted a short distance, to its phantom line position indicated at 78a in FIG. 8. This sufficiently clears the header from the machining operations and situates the mandrels in the ferrule bores with their intake openings 89 in positions to reliably remove all metal cuttings from the machining sites. When the machining operations are completed, header 78 is retracted to its phantom line position indicated at 78b in FIG. 8 and the gripper finger sets are opened. Upon advancement by rods 70 of the next pair of ferrules toward their respective machining positions, the cut ferrules are pushed out from between the gripped fingers to fall into a hopper (not shown). As the next pair of ferrules approach their ultimate machining positions, header 78 is extended to its solid line position in FIG. 8 to precisely locate the ferrules thereat.

As seen in FIG. 5, the twin laser beam paths leading to focusing heads 42 are shrouded by bellows 90 which accommodate the X and Y axes movements thereof. In addition, optical sensors 92, such as C41100 sensors available from Skan-A-Matic Corporation of Elbridge, N.Y., are positioned to monitor the machining operations and confirm that the various feature cuts are indeed being carried through to completion. In addition, tubing 94, communicating with focussing heads 42, introduces a suitable inert gas, such as argon, which is directed downwardly about the cutting beams 43 to blanket the cutting operation and thus inhibit harmful oxidation of the ferrule metal. This is particularly important in the case of nuclear fuel bundle spacers where a low neutron absorption cross section metal, such as a highly reactive zirconium alloy, is necessarily utilized as the ferrule metal. Advantageously, the inert gas flow assists the high flow vacuum system in removing cuttings via mandrels 86.

It will be appreciated that the requisite X and Y axis machining motions, as well as the rotary machining motions may be imparted to the gripper finger sets 46, in which case the focussing heads 42 would remain stationary during the machining operations.

It is seen from the foregoing disclosure that the objects set forth above, including those made apparaent from the preceding detailed description, are efficiently attained, and, since certain changes may be made in the disclosed embodiment without departing from the scope of the invention, it is intended that the matters of detail disclosed herein be taken as illustrative and not in a limiting sense.

Having described the invention, what is claimed as new and desired to secure by Letter Patent is:

1. Apparatus for machining feature cuts in the sidewalls of a succession of tubular parts, each having a bore, said apparatus comprising, in combination:
   A. a laser including a focussing head for directing a cutting beam at a machining site;
   B. a rotary positioner for holding a part in a predetermined machining position at said machining site;
   C. means for delivering parts successively to said positioner;
   D. a first motor for rotating said positioner and a part held thereby through a programmed series of angular motions about the part axis;
   E. a second motor for producing a programmed series of relative motions between said cutting beam and the part along a first axis parallel to the part axis; and
   F. a third motor for producing a programmed series of relative motions between said cutting beam and the part along a second axis normal to the part axis;
   G. whereby upon controlled activations of said motors, said cutting beam is scanned over the surface of the part sidewall in programmed patterns to machine predetermined feature cuts therein.

2. The apparatus defined in claim 1, wherein said rotary positioner includes an arbor rotatably driven by said first motor, a set of angularly spaced gripper fingers mounted by said arbor, and means for opening said gripper fingers to accept each part successively delivered thereto by said delivering means and closing said gripper fingers into gripping engagement with the part periphery to hold each part in said machining position.

3. The apparatus defined in claim 2, wherein said delivering means feeds each part coaxially through said arbor to said gripper finger set.

4. The apparatus defined in claim 3, which further includes a stop mounted for reciprocation between an extended reference position and a retracted position, each part feed by said delivering means to said gripper finger set moves into engagement with said stop in said reference position to establish the part in said machining position.

5. The apparatus defined in claim 4, which further includes vacuum exhaust means, and a mandrel mounted by said stop for reciprocation into and out of the part bore and connected in fluid flow communication with said vacuum exhaust means: said mandrel having an intake opening through which cuttings are exhausted from the machining site.

6. The apparatus defined in claim 5, wherein said second and third motors produce programmed motions of said focussing head along said first and second axes relative to the part.

7. The apparatus defined in claim 5, which further includes fluid handling means for blanketing the machining site with an inert gas.

8. The apparatus defined in claim 5, which further includes means for visually monitoring the progress of the machining of the feature cuts in the part sidewall.

9. The apparatus defined in claim 5 adapted to cut ferrules utilized in nuclear fuel bundle spacers, the features cuts in each ferrule sidewall include a C-shaped cutout, a plurality of circumferentially extending slits and a reference notch in an edge thereof, all in precise positional relation.

10. The apparatus defined in claim 1, wherein said apparatus further includes a pair of focusing heads for directing twin cutting beams at a pair of separate machining sites, a pair of said rotary positioners each holding a part delivered thereto by said delivery means iu predetermined machining positions at each said machining site, said first motor rotating said positioners and the parts respectively held thereby in synchronism through said programmed series of angular motions about the respective part axes, said second motor producing a common programmed series of relative motions between said twin cutting beams and the parts at both said machining sites along said first axis, and said third motor producing a common programmed series of relative motions between the said twin cutting beams and the parts at both said machining site along said second axis, whereby said twin cutting beams respectively scan the surfaces of the part side walls in duplicated programmed patterns to machine identical predetermined feature cuts in the sidewalls of both parts.

11. The apparatus defined in claim 10, wherein said rotary positioners each includes an arbor commonly rotatably driven by said first motor, a set of angularly spaced gripper fingers mounted by each said arbor, and means for opening said gripper fingers of each said set to respectively accept parts delivered thereto in successive pairs by said delivering means and closing said gripper fingers into gripping engagement with the part peripheries to hold each part in said machining positions.

12. The apparatus defined in claim 11, wherein said delivering means feeds each part coaxially through said arbors to said gripper finger sets.

13. The apparatus defined in claim 12, which further includes a stop mounted for reciprocation between an extended reference position and a retracted position, each part feed by said delivering means to said gripper finger sets moves into engagement with said stop in said reference position to establish the parts in said machining positions.

14. The apparatus defined in claim 13, which further includes a vacuum exhaust means, and a pair of mandrels mounted by said stop for reciprocation into and out of the part bores and connected in fluid flow communication with said vacuum exhaust means, each said mandrel having an intake opening through which cuttings are exhausted from the machining sites.

15. The apparatus defined in claim 14, wherein said second and third motors produce programmed motions of said focussing heads along said first and second axes relative to the parts.

16. The apparatus defined in claim 15, which further includes fluid handling means for blanketing the machining sites with an inert gas.

17. The apparatus defined in claim 16, which further includes means at each said machining site for visually monitoring the progress of the machining of the feature cuts in the part sidewalls.

18. The apparatus defined in claim 17 adapted to cut ferrules utilized in nuclear fuel bundle spacers, the feature cuts in each ferrule sidewall include a C-shaped cutout, a plurality of circumferentially extending slits and a reference notch in an edge thereof, all in precise positional relation.

* * * * *